United States Patent
Morris et al.

(10) Patent No.: US 11,803,603 B2
(45) Date of Patent: Oct. 31, 2023

(54) INTEGRATING PLATFORM FOR MANAGING GIS DATA AND IMAGES

(71) Applicant: Overwatch Systems, Ltd., Sterling, VA (US)

(72) Inventors: Matthew Louis Morris, Leesburg, VA (US); Ian Michael Carlson, Missoula, MT (US); Kiley Elisabeth Pfeifer, Olney, MD (US)

(73) Assignee: Overwatch Systems, Ltd., Sterling, VA (US)

( * ) Notice: Subject to any disclaimer, the term of this patent is extended or adjusted under 35 U.S.C. 154(b) by 585 days.

(21) Appl. No.: 16/891,833

(22) Filed: Jun. 3, 2020

(65) Prior Publication Data

US 2020/0380056 A1    Dec. 3, 2020

Related U.S. Application Data

(60) Provisional application No. 62/856,464, filed on Jun. 3, 2019.

(51) Int. Cl.
*G06F 16/9537* (2019.01)
*G06F 16/29* (2019.01)
(Continued)

(52) U.S. Cl.
CPC .......... *G06F 16/9537* (2019.01); *G06F 16/29* (2019.01); *G06F 16/51* (2019.01);
(Continued)

(58) Field of Classification Search
CPC .... G06F 16/9537; G06F 16/587; G06F 16/51; G06F 16/7867; G06F 16/9538; G06F 16/29; G06F 16/2465
(Continued)

(56) References Cited

U.S. PATENT DOCUMENTS 6,329,957 B1   12/2001   Shea et al.
9,256,901 B2 *  2/2016   Vilke ................. G06Q 30/0641
(Continued)

OTHER PUBLICATIONS

Bill Veteto; Textron Systems (Jan. 2018) Disaster Management: Generating Imagery Intelligence Products Quickly using Machine Learning and Distribution via the Cloud, https://geospatialworldforum.org/speaker/SpeakersImages/fullpaper/William%20Veteto.pdf, 13 pages.
(Continued)

*Primary Examiner* — Shahid A Alam
(74) *Attorney, Agent, or Firm* — BainwoodHuang

(57) ABSTRACT

A technique of managing geospatial data includes receiving, by a SaaS (Software as a Service) application hosted from a server, a search query from a client, the search query specifying a geographical range. In response to receiving the search query, the technique further includes identifying multiple search results corresponding to the specified geographical range, the search results including a set of still images of the specified geographical range, a set of full-motion videos of the specified geographical range, and a set of GIS (Geographical Information System) data that pertains to the specified geographical range. In response to a request from the client, the technique further includes storing at least some of the search results in a workspace of the SaaS application, the workspace shared among multiple users of the SaaS application and enabling online collaboration among the users to accomplish geospatial exploitation workflows that fuse multiple data sources.

18 Claims, 9 Drawing Sheets

(51) Int. Cl.
*G06F 16/9538* (2019.01)
*G06F 16/587* (2019.01)
*G06F 16/78* (2019.01)
*G06F 16/51* (2019.01)

(52) U.S. Cl.
CPC ........ *G06F 16/587* (2019.01); *G06F 16/7867* (2019.01); *G06F 16/9538* (2019.01)

(58) Field of Classification Search
USPC ........................................................ 707/722
See application file for complete search history.

(56) References Cited

U.S. PATENT DOCUMENTS

| | | | | |
|---|---|---|---|---|
| 9,332,251 B2* | 5/2016 | Haisty | ................. | H04N 9/3197 |
| 9,930,373 B2* | 3/2018 | Zucchetta | ............... | G06F 21/10 |
| 2005/0065959 A1* | 3/2005 | Smith | ................. | G06F 16/9537 |
| | | | | 707/999.102 |
| 2006/0149700 A1* | 7/2006 | Gladish | ................... | G06F 16/29 |
| 2006/0195423 A1* | 8/2006 | Sastry | ................. | G06F 16/2465 |
| 2013/0306721 A1* | 11/2013 | Meng | ..................... | G06F 16/00 |
| | | | | 235/494 |
| 2020/0120170 A1* | 4/2020 | Amitay | ............... | G06F 16/9537 |

OTHER PUBLICATIONS

Textron Systems (2017), RVCLOUDT™: REMOTEVIEWT™ Through Thick and Thin, 2 pages.
Textron Systems (2014), The Motion Imagery Toolset for Intelligence Analysis, 3 pages.
Textron Systems (saved May 31, 2019), Geocatalog Enterprise: A Service Enabled Data Anagement and Discovery System, 2 pages.
Textron Systems (saved May 31, 2019), Geocatalog™ Enterprise: Advanced Geospatial Data Management, 2 pages.

* cited by examiner

1410

INTEGRATING PLATFORM FOR MANAGING GIS DATA AND IMAGES

CROSS-REFERENCE TO RELATED APPLICATIONS

This application claims the benefit of U.S. Provisional Patent Application No. 62/856,464, filed Jun. 3, 2019, the contents and teachings of which are incorporated herein in their entirety.

BACKGROUND

Various software programs are available for cataloging geospatial data, for analyzing photographic data, and for analyzing video data. For example, Geocatalog™ Enterprise, available from Textron Systems of Sterling, Va., provides on-demand access to geospatial data and images. RVCloud™, also available from Textron Systems, provides a cloud-based platform for accessing and analyzing geospatial imagery.

SUMMARY

Unfortunately, many opportunities for analysis are missed by a failure of disparate software programs to combine information from diverse sources. For instance, while some prior solutions allow analysts to exploit images from satellites, they do not support video content, such as video from aircraft or security cameras. Conversely, prior solutions that provide access to video data do not support various forms of still imagery. Some solutions do not support analysis of GIS (Geographical Information System) data. As a result, analysts are limited in their ability to conveniently access and synthesize geospatial data from various sources.

In contrast with such prior approaches, an improved technique for managing geospatial information allows users to ingest, discover, and exploit geospatial data (e.g., imagery, full-motion video, and GIS data) from a variety of sources in a collaborative environment. The technique provides search and discovery of geo-catalogued data, enabling display and analysis of geographically indexed video (e.g., videos in which frames are individually tagged with geolocation), and enabling display and analysis of satellite images in a common framework that supports new features for comparing and synthesizing information. Advantageously, the improved technique enables analysts to conveniently and collaboratively exploit and compare information from various sources in ways that would be difficult or impractical with prior technologies.

In one aspect, certain embodiments are directed to a method of managing geospatial data. The method includes receiving, by a SaaS (Software as a Service) application hosted from a server, a search query from a client, the search query specifying a geographical range. In response to receiving the search query, the method further includes identifying multiple search results corresponding to the specified geographical range, the search results including a set of still images of the specified geographical range, a set of full-motion videos of the specified geographical range, and a set of GIS (Geographical Information System) data that pertains to the specified geographical range. In response to a request from the client, the method still further includes storing at least some of the search results in a workspace of the SaaS application, the workspace shared among multiple users of the SaaS application and enabling online collaboration among the users to accomplish geospatial exploitation workflows that fuse multiple data sources.

According to some examples, the workspace of the SaaS application is a container owned by an owner-user and shared with a set of other users who are not owners of the container, and the method further comprises providing access to the container by the owner-user and the other users as respective clients of the SaaS application.

According to some examples, the search query further specifies a time range, and identifying the search results includes limiting the set of still images and the set of full-motion videos to the specified time range.

According to some examples, the time range specified in the search query is a particular time of day, and identifying the search results includes limiting the set of still images and the set of full-motion videos to the specified time of day across multiple days.

According to some examples, the method further includes maintaining a subscription by the owner-user to content matching the search query, rerunning the search query on a specified schedule to identify new search results that match the search query, and automatically adding the new search results to the workspace.

In some examples, the method further includes receiving from the client a selection of a frame of video of the search results and receiving from the client a selection of a still image of the search results. The method further includes transmitting to the client a flickering image configured to flicker between the selected frame of the video images and the selected still image.

In some examples, the method further includes receiving from the client a request to capture a selected frame of a video of the full-motion videos from the search results, extracting the selected frame, storing it in an image file, and adding the image file to the workspace.

In some examples, identifying the search results includes providing a link to live video of the specified geographical range.

According to some examples, the method further includes maintaining multiple workspaces of the owner-user corresponding to respective geographical ranges.

According to some examples, the method further includes generating a set of data-object cards for the search results, each data-object card having a first side for displaying a thumbnail of an image or video that corresponds to the geographical range and a second side for displaying metadata associated with the image or video on the first side.

According to some examples, the method further includes generating a geographical map that includes the geographical range specified by the search query, and identifying extents on the map that correspond to ranges covered by the set of still images and the set of full-motion videos of the search results. According to some examples, in response to receipt of an indication that the owner-user has selected an extent on the map, the method further includes transmitting a command to the client to highlight a data-object card that corresponds to the selected extent.

In some examples, the method further includes ingesting new geospatial data from a plurality of sources, the plurality of sources including at least one data source on the Internet, and automatically tagging the new geo spatial data with metadata. According to some examples, the method further includes tagging portions of the new geospatial data with tags provided by users.

In another aspect, certain embodiments are directed to a computerized apparatus that includes control circuitry having a set of processors coupled to memory. The control circuitry is constructed and arranged to receive, by a SaaS (Software as a Service) application hosted from the computerized apparatus, a search query from a client, the search query specifying a geographical range. In response to receipt of the search query, the control circuitry is further constructed and arranged to identify multiple search results corresponding to the specified geographical range, the search results including a set of still images of the specified geographical range, a set of full-motion video of the specified geographical range, and a set of GIS (Geographical Information System) data that pertains to the specified geographical range. In response to a request from the client, the control circuitry is still further constructed and arranged to store at least some of the search results in a workspace of the SaaS application, wherein the workspace is shared among multiple users of the SaaS application and enables online collaboration among the users to accomplish geospatial exploitation workflows that fuse multiple data sources.

In yet another aspect, further embodiments are directed to a computer program product including a set of non-transitory, computer-readable media having instructions which, when executed by control circuitry of a client computing device, cause the client computing device to perform a method of managing geospatial data. The method includes sending a search query to a SaaS (Software as a Service) application on a server, the search query specifying a geographical range. In response to sending the search query, the method further includes receiving multiple search results corresponding to the specified geographical range, the search results including a set of still images of the specified geographical range, a set of full-motion videos of the specified geographical range, and a set of GIS (Geographical Information System) data that pertains to the specified geographical range. In response to a request from a user of the client computing device, the method still further includes directing the server to store at least some of the search results in a workspace of the SaaS application, wherein the workspace is shared among multiple users of the SaaS application and enables online collaboration among the users to accomplish geospatial exploitation workflows that fuse multiple data sources.

According to some examples, the method further includes receiving a user selection of a frame of video of the full-motion videos from the search results and receiving a user selection of a still image of the search results. The method further includes displaying, by the client computing device, a flickering image that flickers between the selected frame of the video and the selected still image.

According to some examples, receiving the search results includes receiving a link to live video of the specified geographical range.

According to some examples, the method further includes displaying a set of data-object cards for the search results, each data-object card having a first side that displays a thumbnail of an image that corresponds to the geographical range and a second side that displays metadata associated with the thumbnail displayed on the first side.

According to some examples, the method further includes rendering a display of a geographical map that includes the geographical range specified by the search query and displaying extents on the map that correspond to ranges covered by the set of still images and the set of full-motion video of the search results. In response to a user selection of an extent on the map, the method further includes highlighting a data-object card that corresponds to the selected extent.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Figure 1:
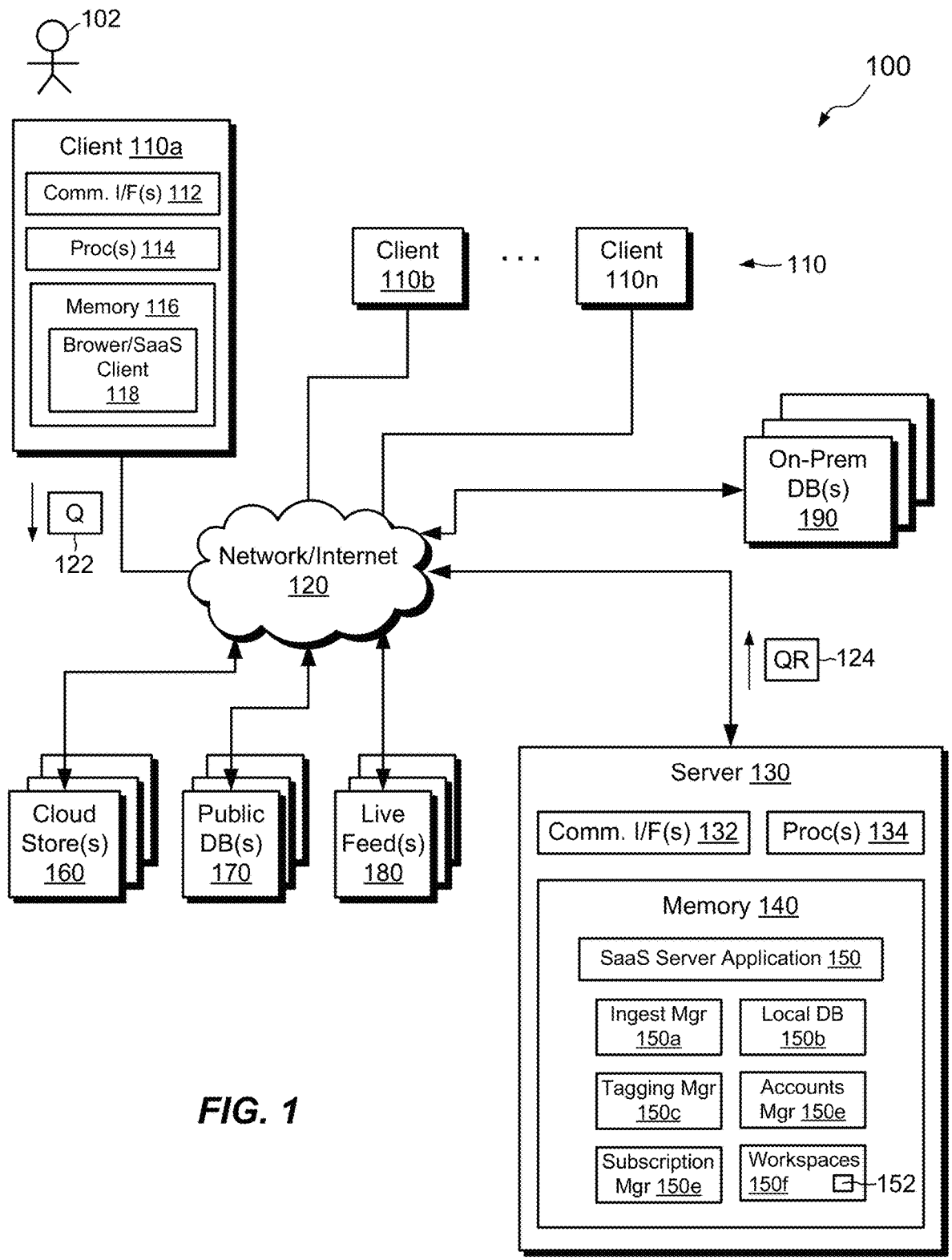
FIG. 1 is a block diagram of an example environment in which embodiments of the improved technique can be practiced.

Embodiments of the improved technique will now be described. One should appreciate that such embodiments are provided by way of example to illustrate certain features and principles but are not intended to be limiting.

Disclosed embodiments are directed to a software platform, which can be deployed in a cloud-infrastructure and/or on-premises, utilizing a web-based experience encompassing many of the necessary tools for a geospatial analyst to complete end-to-end workflows. The disclosed platform allows users to ingest, discover, and exploit geospatial data (e.g., imagery and full-motion video) in a collaborative environment. The platform provides search and discovery of geo-catalogued data, enabling display and analysis of geographically indexed video (e.g., videos in which frames are individually tagged with geolocation), enabling display and analysis of satellite images, and the like, into a common framework that supports new features for comparing and synthesizing information.

For example, the disclosed techniques provide workspaces, i.e., containers and related functionality that correspond to respective location ranges. The ranges may be expressed, for example, as ranges of latitude and longitude, as a specified radius around a particular location, or as a user-selected region, such as a rectangle drawn by a user on a map. A workspace is capable of containing or referencing content from multiple sources for a particular location, such as one identified by geolocation coordinates. A workspace may include satellite images, video (from aircraft, security cameras, etc.), and other GIS data that correspond to a particular location. Workspace features allow for multiple comparison modes, such as side-by-side or grid-based comparisons of multiple images of the same location, overlays of remotely sensed images and video content, and the ability to flicker between remotely sensed images and/or video from different sources and/or for different times, including the ability to flicker between a remotely sensed image (e.g., from a satellite) and a video frame e.g., from an overhead video camera. Flickering enables users to switch quickly between two or more images and to detect changes easily. Other features include the ability to scale, rotate, deskew, and correct for perspective differences between image content from different sources and/or collected from different vantage points. Additional features include the ability to create mosaics by stitching together images of adjacent or overlapping regions, and the ability to modify distorted images such that they can be stitched together more seamlessly.

The disclosed techniques further support precise distance measurements between imaged features, annotation of images, such as the ability to draw boxes and add text, tagging of videos or frames thereof with user comments, and cataloging all information and analysis results in the workspace. Workspaces support collaboration, such that multiple users may access a workspace and contribute their own research and analyses.

Advanced search capabilities permits federated searching across multiple databases for satellite images, GIS data, and full-motion video (e.g., from overhead and/or security cameras), for example, based on location coordinates. By performing a search, the platform may return a number of hits from the disparate sources to the specified location range. The user may select results of interest and include them in the workspace, e.g., as files, links, or the like. The domain of searching may include not only local file systems, but also cloud-based storage, such as Amazon Web Services (AWS) S3 or Microsoft Azure Blob. Searching may be focused on specified times, such that searches may be temporally constrained.

In some examples, workspaces are enabled to subscribe to new content for particular location ranges, such that new images and/or full-motion video or other data for a specified location range are automatically added to a workspace without requiring users to search again. For example, the platform may be configured to run a specified query on some regular basis, such as daily, and to automatically add query results to a workspace, notifying affected users (e.g., by email, text message, or other notification) when new content is added.

In some examples, data for the platform are ingested from both archived sources and live sources, such as live video data. The platform may tag ingested data with metadata that provide information about the source of the data and any relevant circumstances under which the data were acquired (such as percent cloud cover). The platform extracts metadata from images and inserts them in a searchable database, thus enabling metadata-based searching. Some tagging may be performed automatically, whereas other tagging may be performed by users. In some examples, images are analyzed (e.g., using image-processing features and/or machine learning) and tagged based on content found in the images.

In some examples, the platform lists metadata for ingested data (e.g., photographs, video, and other GIS information) in virtual cards displayed by a user interface (UI) of the platform. The cards may include summary information about respective data elements. If a user clicks on a card, the UI may virtually flip the card over to display more detailed metadata about the data element. In some examples, the card provides a thumbnail of a remotely sensed image or video frame.

FIG. 1 shows an example environment 100 in which embodiments of the improved technique can be practiced. Here, client computing machines ("clients") 110 are configured to connect over a network 120 to a server 130. The clients 110 (clients 110a-110n) have respective communication interfaces 112, processors 114, and memory 116, and are each configured to run a SaaS (Software as a Service) client 118, such as a web browser or client-side application program, in respective memory 116. Any number of clients 110 may be provided, including a single client 110. The server 130 has its own communications interface(s) 132, processor(s) 134, and memory 140, and is configured to run a SaaS server application 150. Although the server 130 is shown as a single computer, one should appreciate that the server 130 may include any number of computers that operate together in a coordinated fashion. The environment 100 may further include cloud-based storage 160, such as Microsoft Azure Blob and/or Amazon AWS S3, public databases 170, such as public sources of GIS data, live feeds 180, and on-premises databases 190, such as local data, images, and video.

The communication interfaces 112 and 132 on clients 110 and server 130 may include, for example, network interface adapters (e.g., Ethernet, Wi-Fi, etc.) for converting electronic, wireless, and/or optical signals received over the network 120 to electronic form for internal use, and for converting internal electronic signals to electronic, wireless, and/or optical signals for transmission over the network 120. The processors 114 and 134 may include, in each computing machine, one or more processing chips and/or assemblies, such as numerous multi-core CPUs (central processing units). The memories 116 and 140 each include volatile memory, e.g., RAM (Random Access Memory), and non-volatile memory, such as one or more ROMs (Read-Only Memories), disk drives, solid state drives, and the like. The processor(s) 114 and the memory 116 together form client control circuitry, which is constructed and arranged to carry out various client methods and functions as described herein. Also, the processor(s) 134 and the memory 140 together form server control circuitry, which is constructed and arranged to carry out various server methods and functions as described herein. The memories 116 and 140 each include a variety of software constructs realized in the form of executable instructions. When the executable instructions are run by the associated processor(s), the processor(s) are made to carry out the operations of the software constructs. Although certain software constructs are specifically shown and described, it is understood that the memories 116 and 140 each typically include many other software components, which are not shown, such as an operating system, various applications, processes, and daemons.

The network 120 may be any type of network or combination of networks, such as a local area network (LAN), a wide area network (WAN), the Internet, and/or some other type of network or combination of networks. In an example, the network 120 supports communication using conventional networking standards, such as TCP/IP (Transport Control Protocol/Internet Protocol), NFS (Network File System), and/or CIFS (Common Internet File System). In a particular example, the network 120 includes one or more LANs and/or WANs for supporting on-premises ("on-prem") activity, as well as the Internet. Server 130 may be configured as an Internet server, but it may also be operated on-prem.

The SaaS server application ("application") 150 may be configured as a web application capable of supporting any number of clients 110. As shown, the application 150 includes or otherwise is associated with the following software components:

Ingest manager 150a. Manages ingestion of GIS data from cloud store(s) 160, public database(s) 170, live feed(s) 180, and/or on-prem database(s) 190.

Local database (DB) 150b. Stores local instances or links to ingested GIS data, as well as associated metadata.

Tagging manager 150c. Manages tagging of ingested GIS data and/or other data with tags for facilitating categorization, search, and retrieval. Supports machine-based (automatic) tagging and user-based tagging.

Accounts manager 150d. Supports creation and maintenance of user accounts, profiles, workspaces, and settings.

Subscription manager 150e. Supports subscriptions to specified search queries, including running search queries on defined schedules and refreshing query results based on newly ingested content.

Workspaces 150f. User-defined containers for managing search queries, query results, and collaborative activities. In an example, each workspace corresponds to a respective geographical range.

In example operation, clients 110 run respective instances of the browser/SaaS client 118, which communicate over the network 120 with server application 150 on the server 130. Multiple instances may be provided of the server application 150 for use with respective clients 110. In an example, a user 102 of client 110a may operate the browser/SaaS client 118 on client 110a to issue a query 122 to application 150. The query 122 may specify a particular geographical range, such as a range of latitude and longitude, a specified radius around a particular location, or a user-selected region, such as a rectangle drawn by a user on a map. The query 122 may include additional criteria, such as a date range, time of day, particular weather conditions, and/or the like. Upon receiving the query 122, application 150 runs the query against the local database 150b and generates query results 124 that correspond to the specified geographical range and any other criteria provided. The client 110a receives the query results 124 and displays them within a window of the browser/SaaS client 124. The query results 124 may include still images of the specified geographical range, video of the geographical range, and other information associated with the geographical range. User 102 may view the results and may add particular results to a workspace 152, such as one created for investigating the geographic range that was the subject of the query 122.

In an example, the user 102 is the owner of the workspace 152, and the user (owner-user) 102 may share the workspace 152 with other users, e.g., other users who are also investigating the geographic range. As will be described, the SaaS application 150 provides a variety of functions for promoting analysis and collaboration among users having access to the workspace 152. These include the ability to extract still images from video and to view live video. The functions further include the ability to view still images derived from one source, such as satellite images, side-by-side with extracted frames of video derived from another source, such as an aircraft. Users may be able to flicker between views from different sources, facilitating detection of changes over time and/or from different perspectives, and to perform other functions that synthesize images acquired from different sources.

The SaaS application 150 thus enables users to discover, exploit, analyze, and collaborate around geospatial data through a single unified user experience. Joining these capabilities in a single-use platform allows analysts to complete their end-to-end workflow without leaving their browser windows. The platform described herein, named SeeGEO™, is applicable to many industries, which include but are not limited to the intelligence community, the military, first responders, GIS, environmental conservation, oil and gas/utilities, real estate, and insurance.

The platform infrastructure of the SaaS application 150 is fully containerized and able to be deployed in the Microsoft Azure or AWS (Amazon Web Services) cloud environment, as well as on-premises on a local machine or disconnected device. Users can login to the platform after registering and activating an account. Once logged in, the account owner has the option to create additional user profiles within the account. This capability allows members of a team to login with their own profiles.

Figure 2:
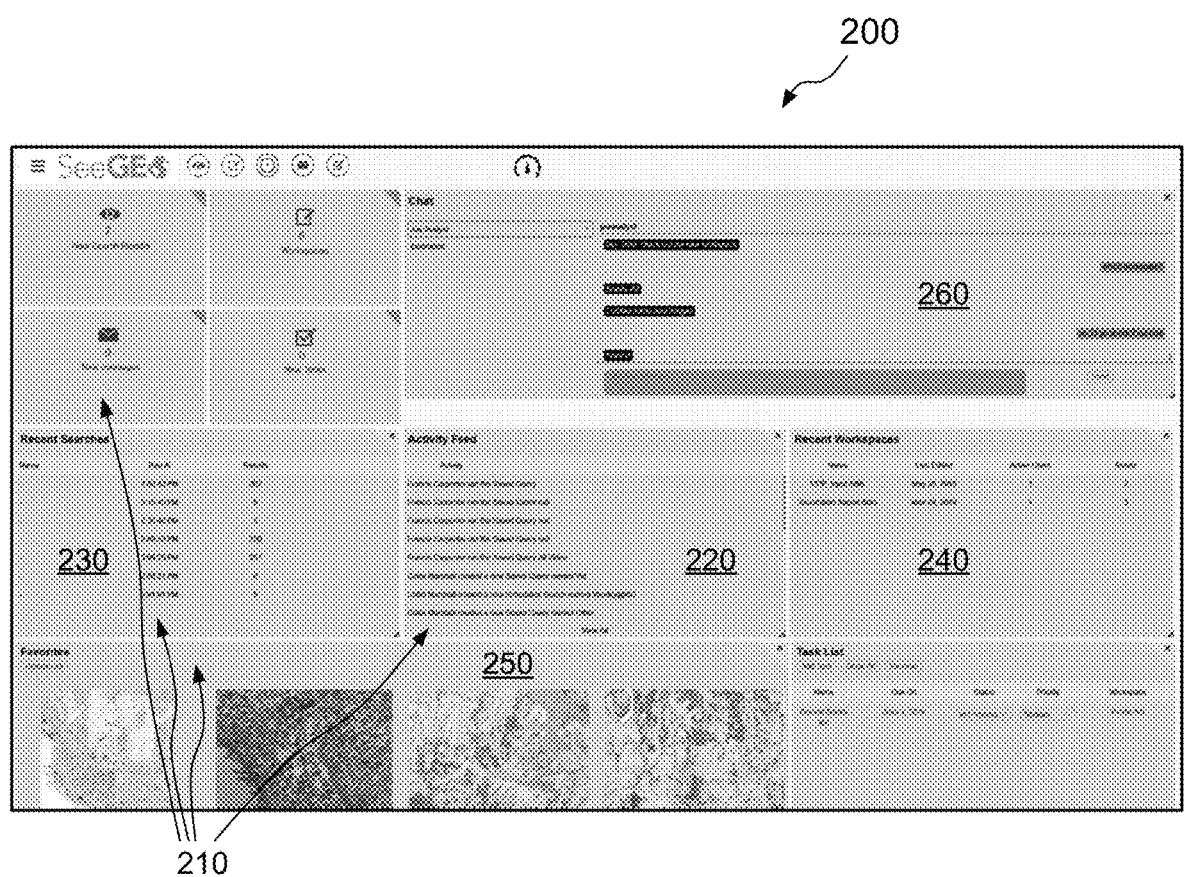
FIG. 2 is a screen display of an example dashboard of a SaaS application on a client computing device of FIG. 1.

FIG. 2 shows an example dashboard view 200, which may be the initial view the user sees when logging into the application 150. The dashboard view 200 serves as a high-level system overview that gives the user a snapshot of their working environment through widgets 210. Each of these widgets 210 provides the user with valuable insight into their own workflow as well as that of any larger organization of which they may be a part.

The Activity Feed widget 220 allows users to view their own activity, as well as the activity of any users with whom they work. Activities include searches for data, storing data in a workspace, imagery or video ingests, tasking, forum posts, annotations, and more.

The Recent Search/Scheduled Search widget 230 allow users to view and repeat previously run searches for Geospatial data with any number of advanced filters applied, and includes statistics on the number of results returned.

The Recent Workspaces widget 240 allows users to view a list of the collaborative environments that they were previously working in so that they can jump right back into their previous workflows. The workspaces in this list are active links to those spaces.

The Favorites widget 250 is a display of user-selected favorites. Users are able to "favorite" any data object—image, video, annotation layer, report, etc.—to their favorites and view that list on the Dashboard. Favorites can be added, opened, removed, and cleared.

The Chat widget 260 enables users to communicate directly with other users in their organization. Users can chat with individuals directly or with groups. This capability allows users to complete another part of their daily workflow, communicating with others, without having to leave the platform. Chat messages can be plain text or links.

Figure 3:
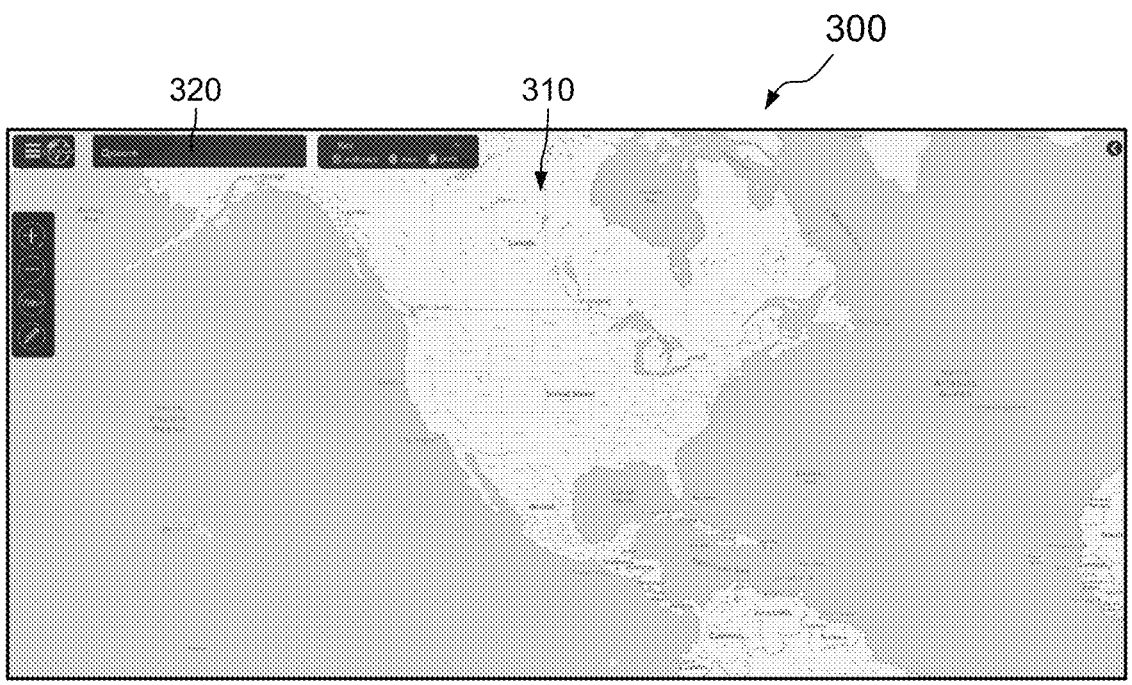
FIG. 3 is a screen display of an example map of the SaaS application.

FIG. 3 shows an example map view 300, which is seen to include a map display 310 and search box 320. The search box 320 allows users to perform a federated search of all connected catalogs for data including, but not limited to, imagery, live and archived video, features, annotation layers, workspaces within the platform, and other document types. The central component of the search interface is the map since most data in the platform is geospatial in nature. Users can zoom and pan the map and change the map view based on preference for either the standard map or aerial view.

Figure 4:
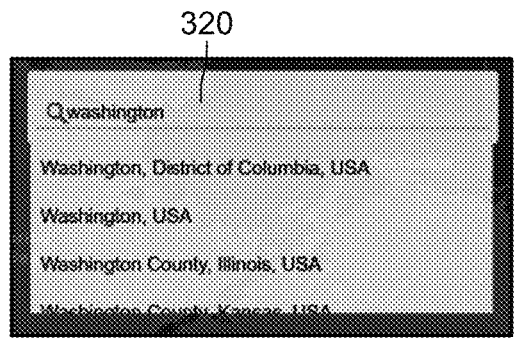
FIG. 4 is a screen display of an example search box of the SaaS application.

FIG. 4 shows example features related to simple searching. Users may begin their search by entering text in the search box 320. This depicted search field powered by OpenStreetMaps Nominatim, a global library that is able to resolve plain text place names with their coordinates on the map. Users can search for countries, cities, airports, monuments, major areas of interest, etc. This simple search box 320 also allows users to filter on the text entered against any metadata field of the data returned.

Figure 5:
FIG. 5 is a screen display of example map tools of the SaaS application.

FIG. 5 shows example features related to map tools 510. The map tools 510 may be located on the left-hand side of the search box 320. These tools allow users to zoom in and out, change the view of the map, and set geospatial bounds for a search. The geospatial filtering tools include a polyline, selection box, radius, and point. Users can also upload their own GeoJSON files to filter their searches. For example, a user may have GeoJSON/shape files for all properties they own/manage. This functionality would allow the user to search through imagery captured of those properties. Users are also able to specify the operator for their geospatial search to return results that intersect, do not intersect, are within, or are not within the extent they have drawn on or uploaded to the map.

Figure 6:
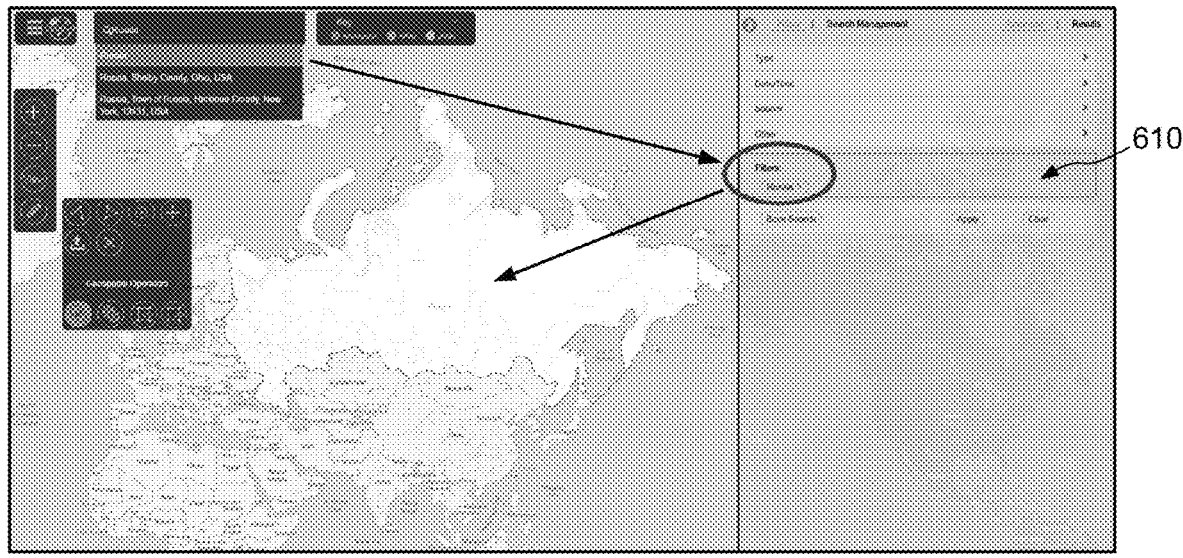
FIG. 6 is a screen display of example geospatial search filters of the SaaS application.

FIG. 6 shows an example use of geospatial filters. As shown, geospatial filters may be visualized on the map and appear in an apply-filter list on the advanced search panel 610. Users can access the advanced search panel 610 to remove filters if no longer needed.

Figure 7:
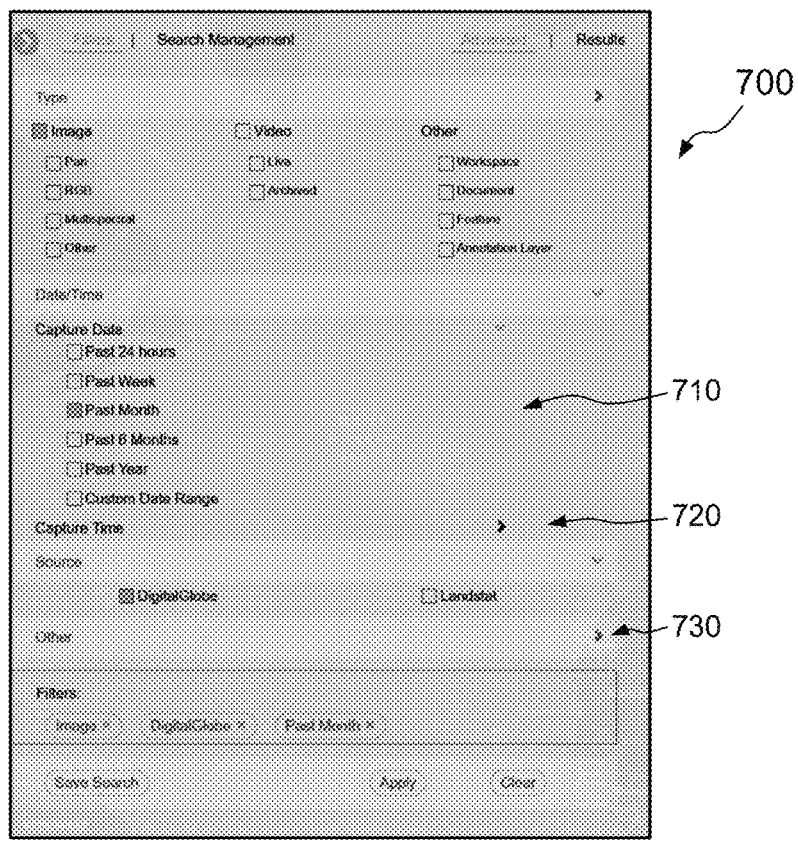
FIG. 7 is a screen display of example advanced search tools of the SaaS application.

FIG. 7 shows example advanced search tools 700 in additional detail. The advanced search tools 700 are accessible, for example, by opening the slide-out menu located in the top right corner of the search box 320. This panel allows users to apply additional filters to further refine their search. The first section of filters limit search results to a specific data type. Users can check multiple boxes in this section and their selections will be applied.

Users are also able to apply temporal filters to their searches. Several simple capture date filters 710 are available to enable the user to return the most recent data. Users can also enter custom date ranges if they are search for data within a specific time frame. The capture-time filter 720 is convenient for users who want to limit their search to a specific time of day (i.e. a user needs imagery taken during the daylight or at night). The capture-time filter 720 may be used in conjunction with the capture-date filters 710 or independently.

The functionality of the sensor platform allows users to filter on the specific satellite/sensor model used to capture the imagery. As more data is ingested into the system, this list of available sensor platforms will automatically be populated with all of the sensor models that are available.

Figure 8:
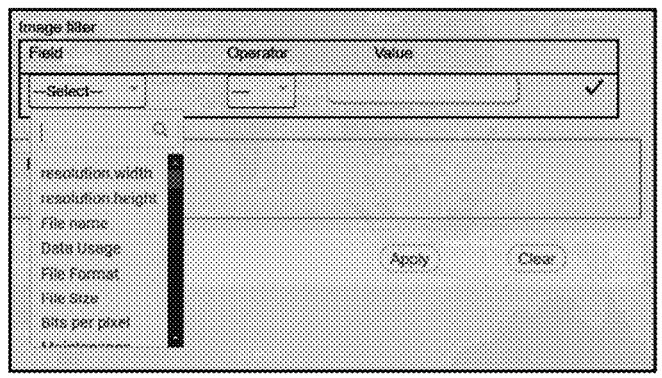
FIG. 8 is a screen display of example image filters of the SaaS application.

The other filter 730 is specific to the data types selected. As shown in FIG. 8, the other filter section allows users to filter on any available metadata field for the specified data type. This list of available metadata fields is populated on ingest. The operators available are dependent on the metadata filter selected. The input type for the value field will be indicated in the input box when a metadata field is selected so that users know what they need to enter. Video metadata filters are also available, but the fields are currently hard-coded. As we continue to improve our video ingest service, these filters will also be automatically populated on ingest.

To apply the custom metadata filters, the user must click the "check", and the filter will appear in the box below. Users can combine any number of metadata filters to refine their search.

Figure 9:
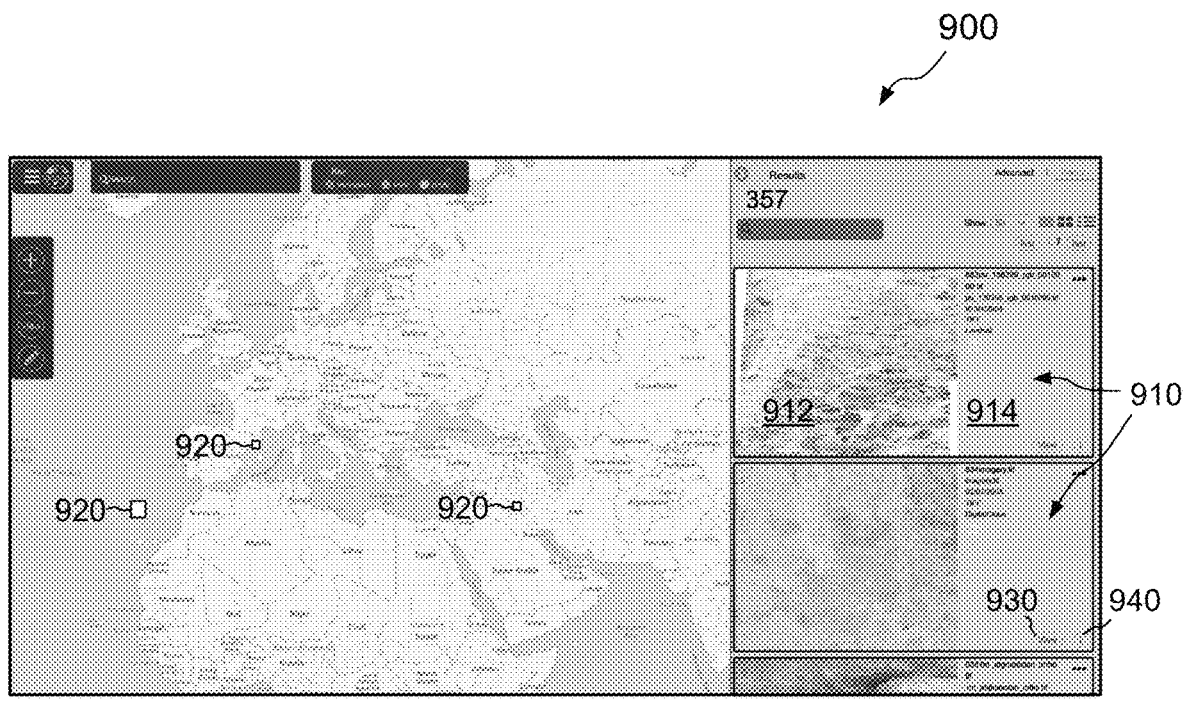
FIG. 9 is a screen display of example search results of the SaaS application, including example data-object cards.

FIG. 9 shows an example display 900 of image search results. Search results are displayed in the same panel where filters were displayed in FIG. 6. As shown, image search results are displayed in data-object cards 910 with thumbnails 912 and metadata 914. The spatial extents 920 are displayed on the map. Selecting an image's footprint (spatial extent) on the map will also highlight the data object card in the results list, and vice-versa. By clicking the menu options in the top right corner, a user can add the selected image to their favorites or a workspace. The image can also be added to favorites by clicking the star button. A filled in star signifies that a given object is already in the favorites. If a user decides to add an image to a workspace, he/she will be prompted to select an existing workspace that he/she has write access to or create a new workspace.

Figures 10, 11:
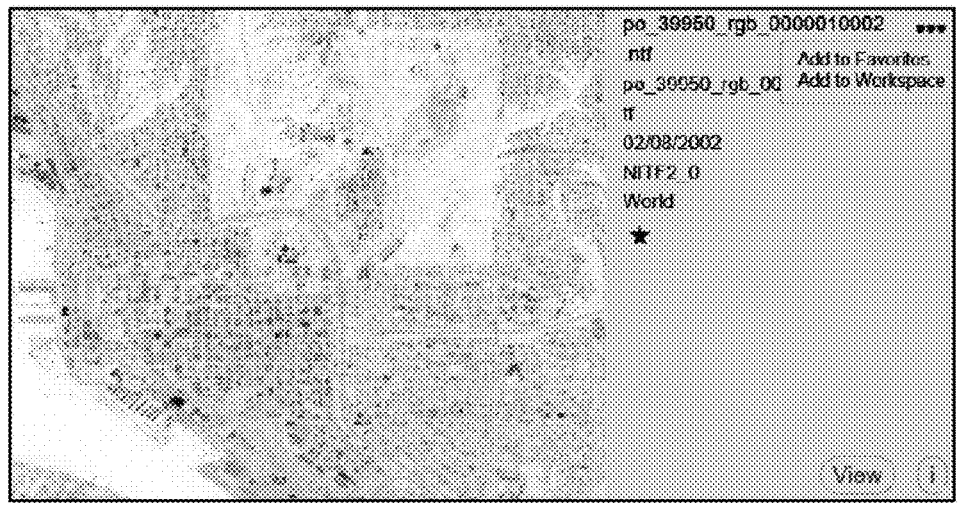
FIG. 10 is a screen display of an example front side of a data-object card for a still image.
FIG. 11 is a screen display of an example back side of the data-object card of FIG. 10.

FIG. 10 shows a front view of a data-object card 910. Clicking the view button 930 on the front of a data-object card 910 will open the image directly in an integrated imagery exploitation tool. If a user clicks an "i" button 940 on the front of an image data-object card 910, the card 910 will appear to flip over to display the image's metadata, as shown in FIG. 11. This provides the user with additional details about the image.

Figure 12:
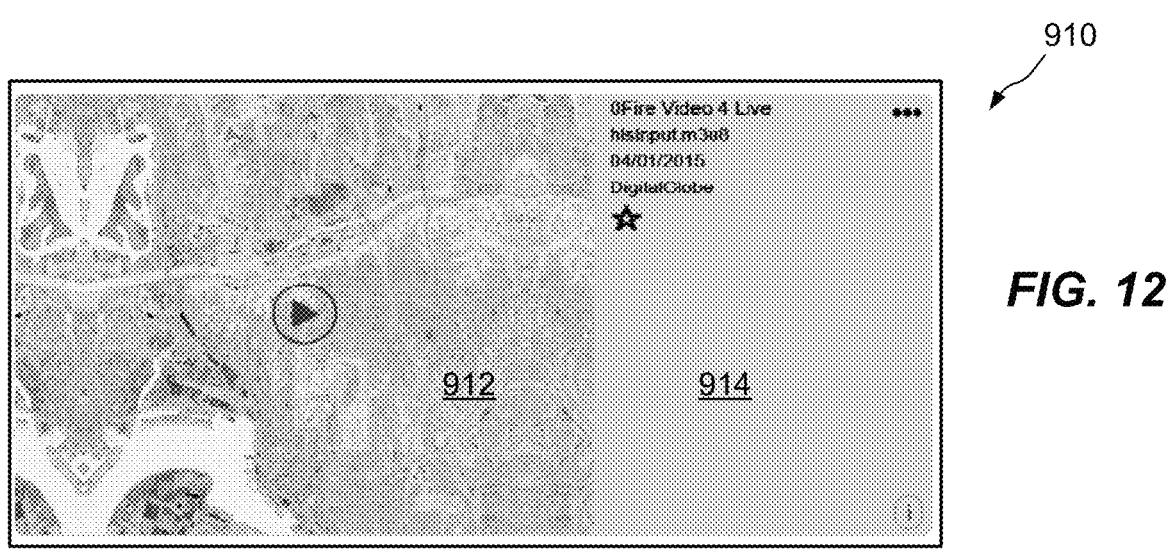
FIG. 12 is a screen display of an example front side of a data-object card for a video.
Figure 13:
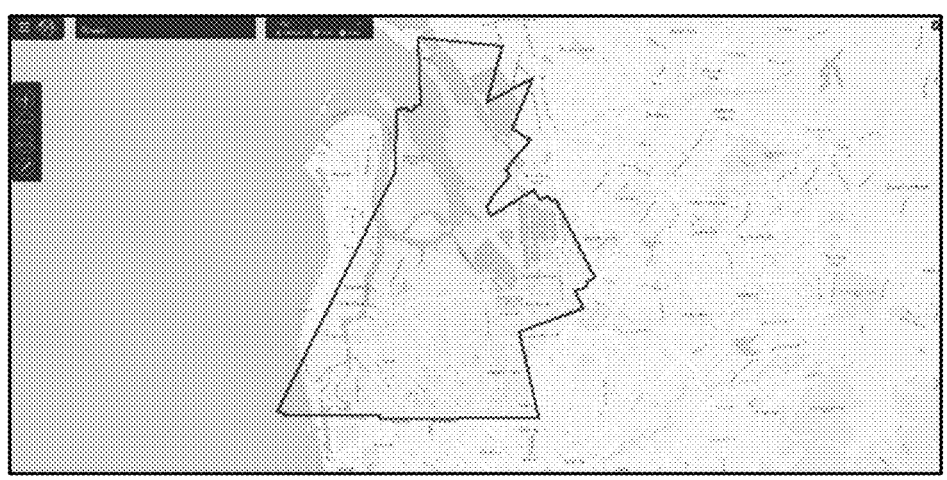
FIG. 13 is an example screen display that appears when a user selects a data-object card for a full-motion video from search results.

As shown in FIG. 12, video search results are displayed in the same format as image search results, in data-object cards with thumbnails and metadata. Spatial extents 920 may be displayed on the map (FIG. 13) and derived from the video using a 2 second sample rate. The map of FIG. 13 may be displayed when the use selects a data-object card for video. The play button on the thumbnail clearly distinguishes video from imagery. The data-object card 910 should also specify whether video is live or archived. Users have the same options with video as they do with imagery, to add to favorites or a workspace by clicking the menu options button in the top right corner, and to view metadata on the back side of the card by clicking the "i" button at the bottom right.

Figure 14:
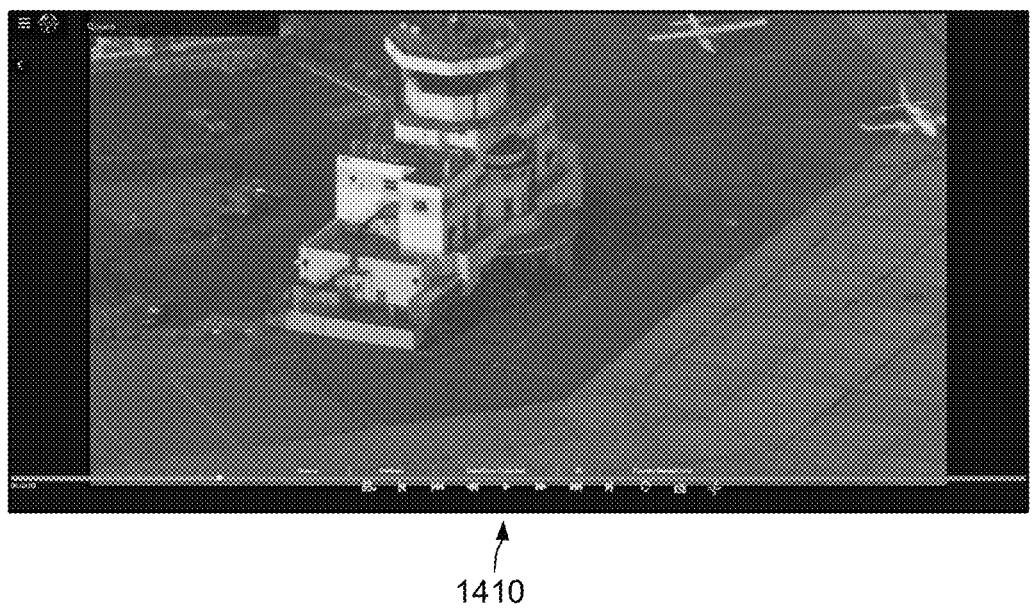
FIG. 14 is a screen display of an example video as played by selecting the data object card of FIG. 12.

FIG. 14 shows an example video display that may be provided as part of the application 150 In an example, video services are backed by a media framework that supports the capture and configuration of live streams, live to VOD, and archived video ingest. Archived and live videos may both be streamed through the media framework. In an example, archived videos are repackaged in MP4 format, and live videos are repackaged to HLS (HTTP Live Streaming) format.

The user can start an archived or live video by clicking a play button 1410 in the center of the track controls at the bottom of the screen. The track controls allow a user to play, pause, rewind, skip back, fast forward, skip forward, or restart the current archived video. A live video can only be played and paused. The time of the video is displayed in the bottom left of the screen and is updated as the video is played. The blue slider is used to display the length of a video and can be adjusted to jump to specific spots.

A user can capture a still image of a full-motion video by clicking the camera icon. The still will be a JPEG or other image capture of the current frame the video is paused on. If the frame metadata includes geospatial coordinates for all four corners, the JPEG is converted to a geo-referenced NITF and will be automatically added to a workspace to collect all stills for the video, and discoverable through the search interface.

A user can also capture a clip of a full-motion video by clicking the scissors icon. This will bring up a secondary slider which is used to select the range of the current video to clip. A popup is also displayed, which will show the start and end time of the clip and prompt for the clip name, optional description, and visibility. After hitting submit, the clip will be discoverable through the search interface.

Figure 15:
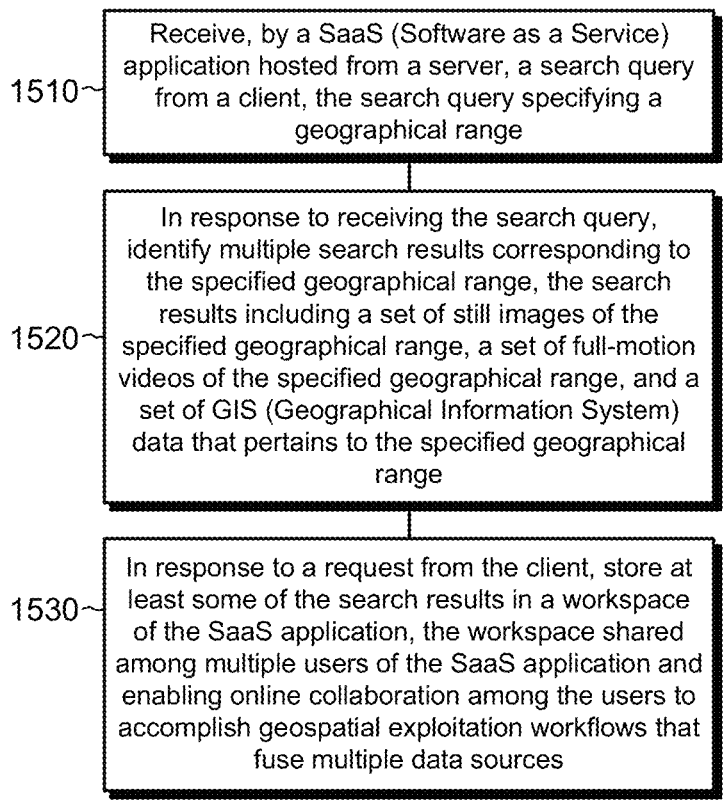
FIGS. 15 and 16 are flowcharts showing example methods of managing GIS data from the perspective of a server (FIG. 15) and from the perspective of a client (FIG. 16).
Figure 15:
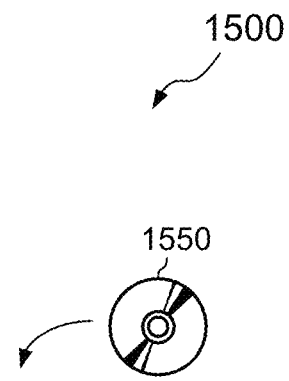
Figure 16:
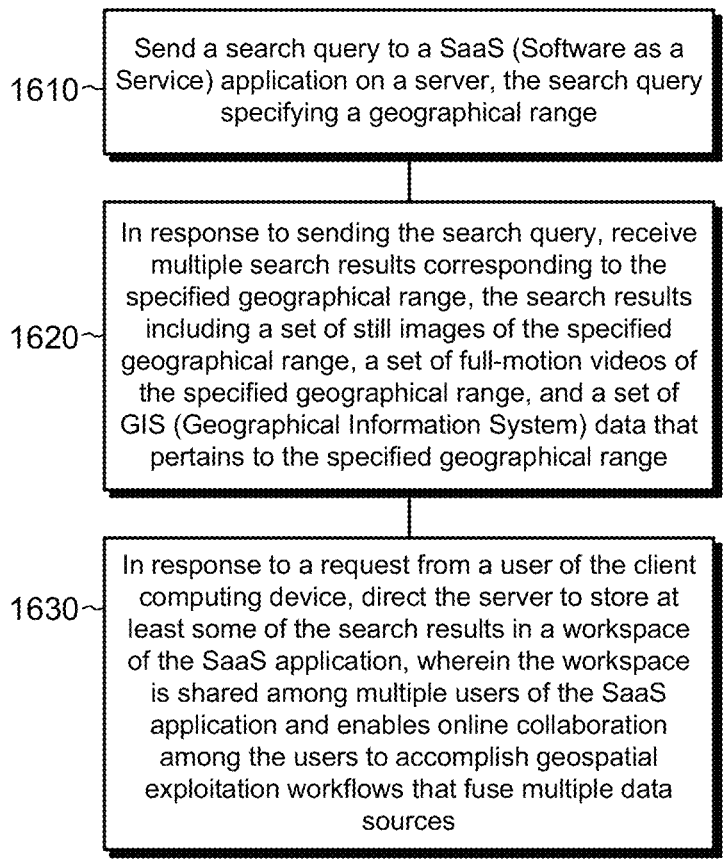
Figure 16:
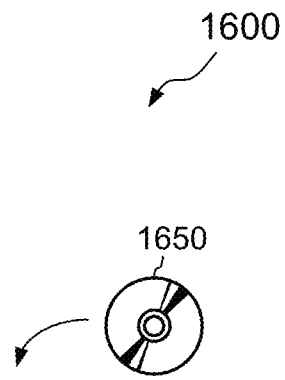

FIGS. 15 and 16 show example methods 1500 and 1600 that may be carried out in connection with the environment 100. The method 1500 is typically performed, for example, by the software constructs described in connection with the server 130 of FIG. 1, which reside in the memory 140 and are run by the processor(s) 134. The method 1600 is typically performed, for example, by the software constructs described in connection with the clients 110 of FIG. 1, which reside in the memory 116 and are run by the processor(s) 114. The various acts of methods 1500 and 1600 may be ordered in any suitable way. Accordingly, embodiments may be constructed in which acts are performed in orders different from those illustrated, which may include performing some acts simultaneously.

As shown in FIG. 15, server method 1500 begins at 1510, where a SaaS application 150 hosted by the server 130 receives a search query 122. The search query may specify a geographical range, as well as other criteria.

At 1520, in response to receiving the search query 122, the server 130 identifies multiple search results 124 corresponding to the specified geographical range. The search results 124 including a set of still images, like those shown in FIG. 9, of the specified geographical range, a set of full-motion video, like that shown in FIG. 12, of the specified geographical range, and a set of GIS data that pertains to the specified geographical range.

At 1530, in response to a request from the client 110, the server 130 stores at least some of the search results 124 in a workspace 152 of the SaaS application 150. The workspace 150 is shared among multiple users of the SaaS application and enables online collaboration among the users to accomplish geospatial exploitation workflows that fuse multiple data sources.

As shown correspondingly in FIG. 16, client method 1600 begins at 1610, where the client 110 sends a search query 122 to a SaaS (Software as a Service) application 150 on a server 130. The search query 122 specifies a geographical range and optionally other criteria.

At 1620, in response to sending the search query 122, the client 110 receives multiple search results 124 corresponding to the specified geographical range. The search results include a set of still images of the specified geographical range, a set of full-motion videos of the specified geographical range.

At 1630, in response to a request from a user 102 of the client computing device 110, the server 130 is directed to store at least some of the search results 124 in a workspace 152 of the SaaS application 150. The workspace 150 is shared among multiple users of the SaaS application and enables online collaboration among the users to accomplish geospatial exploitation workflows that fuse multiple data sources.

An improved technique has been described for managing geospatial information. The technique allows users to ingest, discover, and exploit geospatial data (e.g., imagery, full-motion video, and GIS data) from a variety of sources in a collaborative environment. The technique provides search and discovery of geo-catalogued data, enabling display and analysis of geographically indexed video (e.g., videos in which frames are individually tagged with geolocation), and enabling display and analysis of satellite images in a common framework that supports new features for comparing and synthesizing information. Advantageously, the improved technique enables analysts to conveniently and collaboratively exploit and compare information from various sources in ways that would be difficult or impractical with prior technologies.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as media 1550 and 1650 in FIGS. 15 and 16). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing geospatial data, the method comprising:
   receiving, by a SaaS (Software as a Service) application hosted from a server, a search query transmitted over a network from a client, the search query specifying a geographical range;
   in response to receiving the search query, identifying multiple search results corresponding to the specified geographical range, the search results including a set of still images of the specified geographical range, a set of full-motion videos of the specified geographical range, and a set of GIS (Geographical Information System) data that pertains to the specified geographical range; and
   in response to a request from the client, storing at least some of the search results in a workspace of the SaaS application, the workspace shared among multiple users of the SaaS application and enabling online collaboration among the users to accomplish geospatial exploitation workflows that fuse multiple data sources,
   wherein the method further comprises receiving from the client a selection of a frame of the full-motion videos of the search results, receiving from the client a selection of a still image of the search results, and transmitting to the client a flickering image configured to flicker between the selected frame of the full-motion videos and the selected still image.

2. The method of claim 1, wherein the workspace of the SaaS application is a container owned by an owner-user and shared with a set of other users who are not owners of the container, and wherein the method further comprises providing access to the container by the owner-user and the other users as respective clients of the SaaS application.

3. The method of claim 2, wherein the search query further specifies a time range, and wherein identifying the search results includes limiting the set of still images and the set of full-motion videos to the specified time range.

4. The method of claim 3, wherein the time range specified in the search query is a particular time of day, and wherein identifying the search results includes limiting the set of still images and the set of full-motion videos to the specified time of day across multiple days.

5. The method of claim 3, further comprising:
   maintaining a subscription by the owner-user to content matching the search query;
   rerunning the search query on a specified schedule to identify new search results that match the search query; and
   automatically adding the new search results to the workspace.

6. The method of claim 3, further comprising:
   receiving from the client a request to capture a selected frame of a video of the full-motion videos from the search results;
   extracting the selected frame and storing it in an image file; and
   adding the image file to the workspace.

7. The method of claim 2, wherein identifying the search results includes providing a link to live video of the specified geographical range.

8. The method of claim 2, further comprising maintaining multiple workspaces of the owner-user corresponding to respective geographical ranges.

9. The method of claim 2, further comprising generating a set of data-object cards for the search results, each data-object card having a first side for displaying a thumbnail of an image or video that corresponds to the geographical range and a second side for displaying metadata associated with the image or video on the first side.

10. The method of claim 2, further comprising generating a geographical map that includes the geographical range specified by the search query, and identifying extents on the map that correspond to ranges covered by the set of still images and the set of full-motion videos of the search results.

11. The method of claim 10, further comprising, in response to receipt of an indication that the owner-user has selected an extent on the map, transmitting a command to the client to highlight a data-object card that corresponds to the selected extent.

12. The method of claim 2, further comprising:
    ingesting new geospatial data from a plurality of sources, the plurality of sources including at least one data source on the Internet; and
    automatically tagging the new geospatial data with metadata.

13. The method of claim 12, further comprising tagging portions of the new geospatial data with tags provided by users.

14. A computer program product including a set of non-transitory, computer-readable media having instructions which, when executed by control circuitry of a client computing device, cause the client computing device to perform a method of managing geospatial data, the method comprising:
    sending a search query over a network to a SaaS (Software as a Service) application on a server, the search query specifying a geographical range;
    in response to sending the search query, receiving multiple search results corresponding to the specified geographical range, the search results including a set of still images of the specified geographical range, a set of full-motion videos of the specified geographical range, and a set of GIS (Geographical Information System) data that pertains to the specified geographical range;
    in response to a request from a user of the client computing device, directing the server to store at least some of the search results in a workspace of the SaaS application, wherein the workspace is shared among multiple users of the SaaS application and enables online collaboration among the users to accomplish geospatial exploitation workflows that fuse multiple data sources; and
    displaying a flickering image that flickers between a user-selected frame of video of the set of full-motion videos and a user-selected still image of set of still images wherein displaying the flickering image is responsive to user-controlled flickering between the user-selected frame of video and the user-selected still image, facilitating detection of changes over time and/or from different perspectives.

15. The computer program product of claim 14, wherein receiving the search results includes receiving a link to live video of the specified geographical range.

16. The computer program product of claim 14, wherein the method further comprises displaying a set of data-object cards for the search results, each data-object card having a first side that displays a thumbnail of an image that corresponds to the geographical range and a second side that displays metadata associated with the thumbnail displayed on the first side.

17. The computer program product of claim 14, wherein the method further comprises:
rendering a display of a geographical map that includes the geographical range specified by the search query;
displaying extents on the map that correspond to ranges covered by the set of still images and the set of full-motion videos of the search results; and
in response to a user selection of an extent on the map, highlighting a data-object card that corresponds to the selected extent.

18. A method of managing geospatial data, the method comprising:
receiving, by a SaaS (Software as a Service) application hosted from a server, a search query transmitted over a network from a client, the search query specifying a geographical range;
in response to receiving the search query, identifying multiple search results corresponding to the specified geographical range, the search results including a set of still images of the specified geographical range, a set of full-motion videos of the specified geographical range, and a set of GIS (Geographical Information System) data that pertains to the specified geographical range; and
in response to receiving a user selection of a client-selected frame of the set of full-motion videos and a client-selected still image of the set of still images, transmitting to the client the client-selected frame of the set of full-motion videos and the client-selected still image of the set of still images, said transmitting enabling a user to flicker between the client-selected frame of the set of full-motion videos and the client-selected still image of the set of still images, facilitating detection of changes over time and/or from different perspectives.

* * * * *